(12) United States Patent
Balasubramanian et al.

(10) Patent No.: US 10,972,947 B2
(45) Date of Patent: Apr. 6, 2021

(54) SECURE PACKET DATA CONVERGENCE PROTOCOL (PDCP) VERSION CHANGE

(71) Applicant: QUALCOMM Incorporated, San Diego, CA (US)

(72) Inventors: Arun Prasanth Balasubramanian, San Diego, CA (US); Masato Kitazoe, Hachiouji (JP); Yu-Ting Yu, San Francisco, CA (US); Keiichi Kubota, Tokyo (JP)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/373,205

(22) Filed: Apr. 2, 2019

(65) Prior Publication Data
US 2019/0313294 A1 Oct. 10, 2019

Related U.S. Application Data

(60) Provisional application No. 62/653,174, filed on Apr. 5, 2018.

(51) Int. Cl.
*H04W 36/00* (2009.01)
*H04W 80/08* (2009.01)
(Continued)

(52) U.S. Cl.
CPC ......... *H04W 36/0038* (2013.01); *H04W 8/08* (2013.01); *H04W 12/0013* (2019.01);
(Continued)

(58) Field of Classification Search
CPC ................................................ H04W 36/0038
(Continued)

(56) References Cited

U.S. PATENT DOCUMENTS

| 2016/0191471 | A1* | 6/2016 | Ryoo | H04W 12/04031 |
| | | | | 455/411 |
| 2018/0092085 | A1 | 3/2018 | Shaheen et al. | |
| 2020/0245401 | A1* | 7/2020 | Ingale | H04W 36/14 |

OTHER PUBLICATIONS

"LTE: Evolved Universal Terrestrial Radio Access (E-UTRA), Radio Resource Control (RRC), Protocol Specification (3GPP TS 36.331 version 14.5.1 Release 14)", ETSI Technical Specification, European Telecommunications Standards Institute (ETSI), 650, Route Des Lucioles, F-06921 Sophia-Antipolis, France, vol. 3GPP RAN, No. V14.5.1, Jan. 19, 2018 (Jan. 19, 2018), pp. 1-772, XP014311494, Retrieved from the Internet: URL:http://www.etsi.org/deliver/etsi_ts/13_6300_136399/136331/14.05.01_60/ts_136331v140501p.pdf [retrieved on Jan. 19, 2018] p. 86, paragraph 5.3.5-p. 95, paragraph 5.3.5.8.

(Continued)

*Primary Examiner* — Peter G Solinsky
(74) *Attorney, Agent, or Firm* — Harrity & Harrity, LLP

(57) ABSTRACT

Various aspects of the present disclosure generally relate to wireless communication. In some aspects, a user equipment (UE) may receive a message that indicates a change from an evolved universal mobile telecommunications system (UMTS) terrestrial radio access (E-UTRA) packet data convergence protocol (PDCP) to a New Radio (NR) PDCP, wherein the message includes an instruction to perform an intra-cell handover; generate one or more security keys based at least in part on receiving the message that includes the instruction to perform the intra-cell handover; and communicate using the one or more security keys after the intra-cell handover is performed. Numerous other aspects are provided.

30 Claims, 9 Drawing Sheets

(51) Int. Cl.
    *H04W 36/04* (2009.01)
    *H04W 12/00* (2021.01)
    *H04W 76/27* (2018.01)
    *H04W 72/04* (2009.01)
    *H04W 8/08* (2009.01)
    *H04W 12/04* (2021.01)

(52) U.S. Cl.
    CPC ....... *H04W 12/0401* (2019.01); *H04W 36/04* (2013.01); *H04W 72/0446* (2013.01); *H04W 76/27* (2018.02); *H04W 80/08* (2013.01)

(58) Field of Classification Search
    USPC .......................................................... 370/331
    See application file for complete search history.

(56) References Cited

OTHER PUBLICATIONS

Ericsson: "PDCP version change for SRBs", 3GPP Draft; 3GPP TSG-RAN WG2 #100, R2-1713438, PDCP version change for SRBs, 3rd Generation Partnership Project (3GPP), Mobile Competence Centre, 650, Route Des Lucioles, F-06921 Sophia-Antipolis Cedex, France, vol. RAN WG2. No. Reno, Nevada, USA, Nov. 27, 2017-Dec. 1, 2017, Nov. 17, 2017 (Nov. 17, 2017), XP051372161, pp. 1-4, Retrieved from the Internet: URL:http://www.3gpp.org/ftp/tsg%5Fran/WG2%5FRL2/TSGR2%5F100/Docs/ [retrieved on Nov. 17, 2017] p. 1, paragraph 2.1.1-p. 2.

Ericsson: "Summary of email discussion #30 for RRC Connection Reconfiguration", 3GPP Draft; 3GPP TSG-RAN WG2 #92, R2-1711961, Summary of RRC Connection Reconfiguration Email Discussion, 3rd Generation Partnership Project (3GPP), Mobile Competence Centre, 650, Route Des Lucioles, F-06921 Sophia-Antipo, vol. RAN WG2. No. Prague, Czech Republic, Oct. 9, 2017-Oct. 13, 2017, Oct. 13, 2017 (Oct. 13, 2017), XP051355976, pp. 1-27, Retrieved from the Internet: URL:http://www.3gpp.org/ftp/tsg_ran/WG2_RL2/TSGR2_99bis/Docs/ [retrieved on Oct. 13, 2017] the whole document.

International Search Report and Written Opinion—PCT/US2019/025556—ISA/EPO—dated Aug. 2, 2019.

LG Electronics Inc: "Consideration on PDCP Version Change in eLTE", 3GPP Draft; 3GPP TSG-RAN2 Meeting RAN2 #100, R2-1713610, Consideration on PDCP Version Change in-eLTE, 3rd Generation Partnership Project (3GPP), Mobile Competence Centre, 650, Route Des Lucioles, F-06921 Sophia-Antipolis Cedex, FR, vol. RAN WG2, No. Reno. Nevada, USA, Nov. 27, 2017-Dec. 1, 2017, Nov. 17, 2017 (Nov. 17, 2017), XP051372284, 3 Pages, Retrieved from the Internet: URL:http://www.3gpp.org/ftp/tsg%5Fran/WG2%5FRL2/TSGR2%5F100/Docs/ [retrieved on Nov. 17, 2017] the whole document.

Qualcomm Incorporated: "Considerations on PDCP version change", 3GPP Draft; 3GPP TSG-RAN WG2 Meeting #99bis, R2-1711519 Considerations on PDCP version change, 3rd Generation Partnership Project (3GPP), Mobile Competence Centre, 650, Route Des Lucioles, F-06921 Sophia-Antipolis Cedex, France, vol. RAN WG2. No. Prague. Czech Republic, Oct. 9, 2017-Oct. 13, 2017, Sep. 29, 2017 (Sep. 29, 2017), XP051355593, 2 Pages, Retrieved from the Internet: URL:http://www.3gpp.org/ftp/tsg_ran/WG2_RL2/TSGR2_99bis/Docs/ [retrieved on Sep. 29, 2017] the whole document.

Samsung: "PDCP operations during PDCP version change in EN-DC", 3GPP Draft; 3GPP TSG-RAN WG2 2017 RAN2#99bis Meeting, R2-1711146, PDCP operations during PDCP version change in EN-DC, 3rd Generation Partnership Project (3GPP), Mobile Competence Centre,650, Route Des Lucioles, F-06921 Sophia-Antipolis, CED, vol. RAN WG2, No. Prague, CZ, Oct. 9, 2017-Oct. 13, 2017, Oct. 8, 2017 (Oct. 8, 2017), XP051343154, 12 Pages, Retrieved from the Internet: URL:http://www.3gpp.org/ftp/Meetings_3GPP_SYNC/RAN2/Docs/ [retrieved on Oct. 8, 2017] p. 1-p. 2.

Samsung: "Lossless PDCP version change between LTE and NR", 3GPP Draft; 3GPP TSG-RAN WG2 Meeting #99bis, R2-1711781, Lossless PDCP Version Change, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Oct. 1, 2017-Sep. 29, 2017 (Sep. 29, 2017), XP051355814, 3 Pages, Retrieved from the Internet: URL:http://www.3gpp.org/ftp/tsg_ran/WG2_RL2/TSGR2_99bis/Docs/ [retrieved on Sep. 29, 2017] the whole document.

* cited by examiner

1

SECURE PACKET DATA CONVERGENCE PROTOCOL (PDCP) VERSION CHANGE

CROSS-REFERENCE TO RELATED APPLICATIONS UNDER 35 U.S.C. § 119

This application claims priority to U.S. Provisional Patent Application No. 62/653,174, filed on Apr. 5, 2018, entitled "TECHNIQUES AND APPARATUSES FOR A SECURE PACKET DATA CONVERGENCE PROTOCOL (PDCP) VERSION CHANGE," which is hereby expressly incorporated by reference herein.

FIELD OF THE DISCLOSURE

Aspects of the present disclosure generally relate to wireless communication, and more particularly to techniques and apparatuses for a secure packet data convergence protocol (PDCP) version change.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a message that indicates a change from an evolved universal mobile telecommunications system (UMTS) terrestrial radio access (E-UTRA) packet data convergence protocol (PDCP) to a New Radio (NR) PDCP, wherein the message includes an instruction to perform an intra-cell handover; generating one or more security keys based at least in part on receiving the message that includes the instruction to perform the intra-cell handover; and communicating using the one or more security keys after the intra-cell handover is performed.

In some aspects, a user equipment for wireless communication may include memory and one or more processors coupled to the memory. The memory and the one or more processors may be configured to receive a message that indicates a change from an E-UTRA PDCP to an NR PDCP, wherein the message includes an instruction to perform an intra-cell handover; generate one or more security keys based at least in part on receiving the message that includes the instruction to perform the intra-cell handover; and communicate using the one or more security keys after the intra-cell handover is performed.

In some aspects, a non-transitory computer-readable medium may store one or more instructions for wireless communication. The one or more instructions, when executed by one or more processors of a user equipment, may cause the one or more processors to receive a message that indicates a change from an E-UTRA PDCP to an NR PDCP, wherein the message includes an instruction to perform an intra-cell handover; generate one or more security keys based at least in part on receiving the message that includes the instruction to perform the intra-cell handover; and communicate using the one or more security keys after the intra-cell handover is performed.

In some aspects, an apparatus for wireless communication may include means for receiving a message that indicates a change from an E-UTRA PDCP to an NR PDCP, wherein the message includes an instruction to perform an intra-cell handover; means for generating one or more security keys based at least in part on receiving the message that includes the instruction to perform the intra-cell handover; and means for communicating using the one or more security keys after the intra-cell handover is performed.

In some aspects, a method of wireless communication, performed by a base station, may include transmitting a message that indicates a change from an E-UTRA PDCP to an NR PDCP, wherein the message includes an instruction to perform an intra-cell handover; generating one or more security keys based at least in part on transmitting the message that includes the instruction to perform the intra-cell handover; and communicating using the one or more security keys after the intra-cell handover is performed.

In some aspects, a base station for wireless communication may include memory and one or more processors coupled to the memory. The memory and the one or more processors may be configured to transmit a message that indicates a change from an E-UTRA PDCP to an NR PDCP, wherein the message includes an instruction to perform an intra-cell handover; generate one or more security keys based at least in part on transmitting the message that includes the instruction to perform the intra-cell handover; and communicate using the one or more security keys after the intra-cell handover is performed.

In some aspects, a non-transitory computer-readable medium may store one or more instructions for wireless communication. The one or more instructions, when executed by one or more processors of a base station, may cause the one or more processors to transmit a message that indicates a change from an E-UTRA PDCP to an NR PDCP, wherein the message includes an instruction to perform an intra-cell handover; generate one or more security keys based at least in part on transmitting the message that includes the instruction to perform the intra-cell handover; and communicate using the one or more security keys after the intra-cell handover is performed.

In some aspects, an apparatus for wireless communication may include means for transmitting a message that indicates a change from an E-UTRA PDCP to an NR PDCP, wherein the message includes an instruction to perform an intra-cell handover; means for generating one or more security keys based at least in part on transmitting the message that includes the instruction to perform the intra-cell handover; and means for communicating using the one or more security keys after the intra-cell handover is performed.

In some aspects, a method of wireless communication, performed by a UE, may include receiving a message that indicates a change from an E-UTRA PDCP to an NR PDCP; determining a first sequence number that was used prior to receiving the message; determining a second sequence number, to be used after receiving the message, based at least in part on the first sequence number; and communicating using the second sequence number.

In some aspects, a user equipment for wireless communication may include memory and one or more processors coupled to the memory. The memory and the one or more processors may be configured to receive a message that indicates a change from an E-UTRA PDCP to an NR PDCP; determine a first sequence number that was used prior to receiving the message; determine a second sequence number, to be used after receiving the message, based at least in part on the first sequence number; and communicate using the second sequence number.

In some aspects, a non-transitory computer-readable medium may store one or more instructions for wireless communication. The one or more instructions, when executed by one or more processors of a user equipment, may cause the one or more processors to receive a message that indicates a change from an E-UTRA PDCP to an NR PDCP; determine a first sequence number that was used prior to receiving the message; determine a second sequence number, to be used after receiving the message, based at least in part on the first sequence number; and communicate using the second sequence number.

In some aspects, an apparatus for wireless communication may include means for receiving a message that indicates a change from an E-UTRA PDCP to an NR PDCP; means for determining a first sequence number that was used prior to receiving the message; means for determining a second sequence number, to be used after receiving the message, based at least in part on the first sequence number; and means for communicating using the second sequence number.

In some aspects, a method of wireless communication, performed by a base station, may include transmitting a message that indicates a change from an E-UTRA PDCP to an NR PDCP; determining a first sequence number that was used prior to transmitting the message; determining a second sequence number, to be used after transmitting the message, based at least in part on the first sequence number; and communicating using the second sequence number.

In some aspects, a base station for wireless communication may include memory and one or more processors coupled to the memory. The memory and the one or more processors may be configured to transmit a message that indicates a change from an E-UTRA PDCP to an NR PDCP; determine a first sequence number that was used prior to transmitting the message; determine a second sequence number, to be used after transmitting the message, based at least in part on the first sequence number; and communicate using the second sequence number.

In some aspects, a non-transitory computer-readable medium may store one or more instructions for wireless communication. The one or more instructions, when executed by one or more processors of a base station, may cause the one or more processors to transmit a message that indicates a change from an E-UTRA PDCP to an NR PDCP; determine a first sequence number that was used prior to transmitting the message; determine a second sequence number, to be used after transmitting the message, based at least in part on the first sequence number; and communicate using the second sequence number.

In some aspects, an apparatus for wireless communication may include means for transmitting a message that indicates a change from an E-UTRA PDCP to an NR PDCP; means for determining a first sequence number that was used prior to transmitting the message; means for determining a second sequence number, to be used after transmitting the message, based at least in part on the first sequence number; and means for communicating using the second sequence number.

In some aspects, a method of wireless communication, performed by a UE, may include receiving a message that includes an instruction to perform intra-cell handover and an instruction to change from an E-UTRA PDCP to an NR PDCP for a radio bearer; triggering a key reset procedure comprising generating one or more security keys based at least in part on the instruction to perform the intra-cell handover and the instruction to change from the E-UTRA PDCP to the NR PDCP for the radio bearer; and communicating using the one or more security keys after the intra-cell handover is performed.

In some aspects, a UE for wireless communication may include memory and one or more processors coupled to the memory. The memory and the one or more processors may be configured to receive a message that includes an instruction to perform intra-cell handover and an instruction to change from an E-UTRA PDCP to an NR PDCP for a radio bearer; trigger a key reset procedure comprising generating one or more security keys based at least in part on the instruction to perform the intra-cell handover and the instruction to change from the E-UTRA PDCP to the NR PDCP for the radio bearer; and communicate using the one or more security keys after the intra-cell handover is performed.

In some aspects, a non-transitory computer-readable medium may store one or more instructions for wireless communication. The one or more instructions, when executed by one or more processors of a UE, may cause the one or more processors to receive a message that includes an instruction to perform intra-cell handover and an instruction to change from an E-UTRA PDCP to an NR PDCP for a radio bearer; trigger a key reset procedure comprising generating one or more security keys based at least in part on the instruction to perform the intra-cell handover and the instruction to change from the E-UTRA PDCP to the NR PDCP for the radio bearer; and communicate using the one or more security keys after the intra-cell handover is performed.

In some aspects, an apparatus for wireless communication may include means for receiving a message that includes an instruction to perform intra-cell handover and an instruction to change from an E-UTRA PDCP to an NR PDCP for a radio bearer; means for triggering a key reset procedure comprising generating one or more security keys based at least in part on the instruction to perform the intra-cell handover and the instruction to change from the E-UTRA PDCP to the NR PDCP for the radio bearer; and means for communicating using the one or more security keys after the intra-cell handover is performed.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
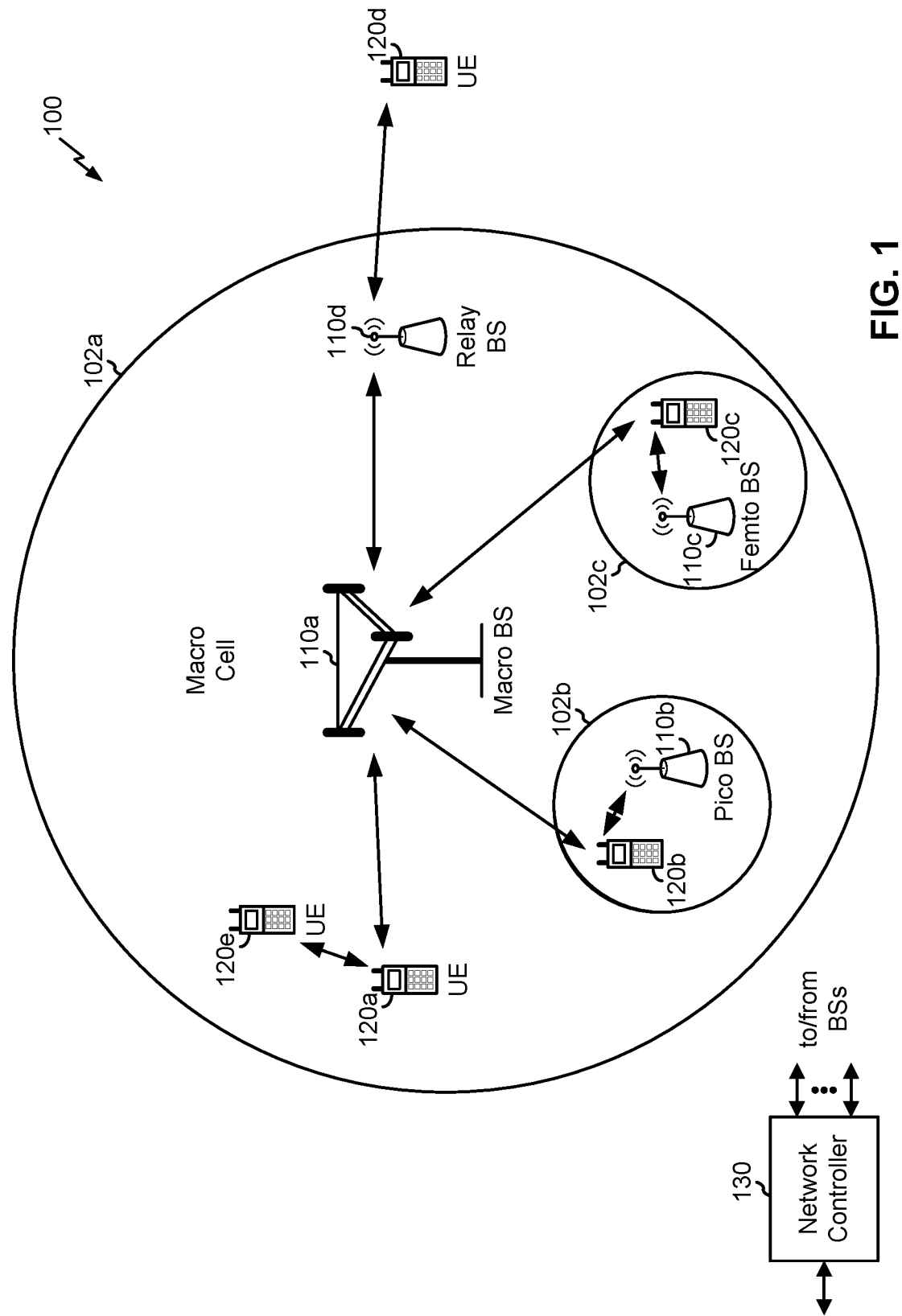
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
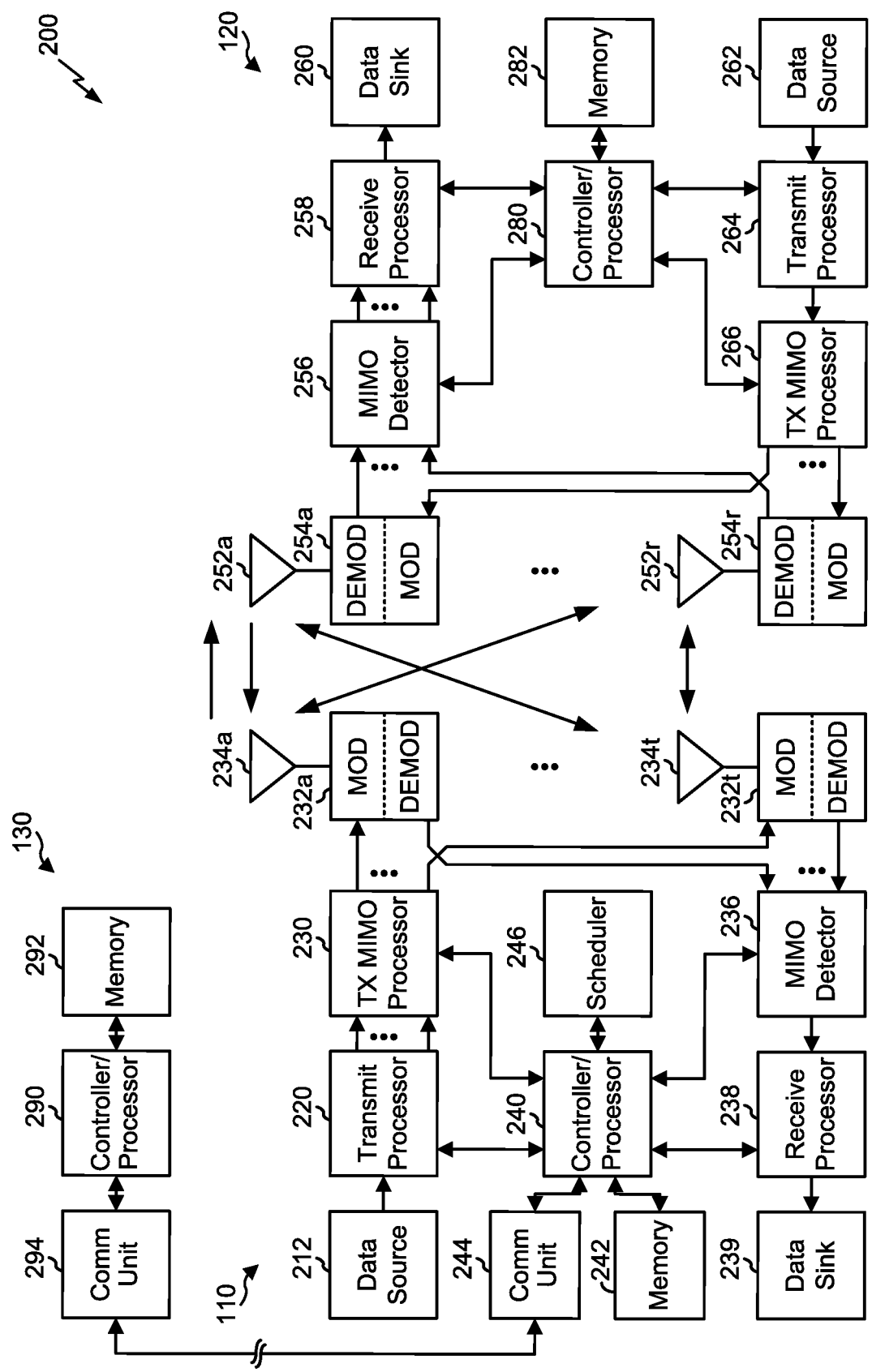
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with a secure PDCP version change, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, process 700 of FIG. 7, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving a message that indicates a change from an evolved universal mobile telecommunications system (UMTS) terrestrial radio access (E-UTRA) packet data convergence protocol (PDCP) to a New Radio (NR) PDCP, wherein the message includes an instruction to perform an intra-cell handover; means for generating one or more security keys based at least in part on receiving the message that includes the instruction to perform the intra-cell handover; means for communicating using the one or more security keys after the intra-cell handover is performed; and/or the like. Additionally, or alternatively, UE 120 may include means for receiving a message that indicates a change from an E-UTRA PDCP to an NR PDCP; means for determining a first sequence number that was used prior to receiving the message; means for determining a second sequence number, to be used after receiving the message, based at least in part on the first sequence number; means for communicating using the second sequence number; and/or the like. Additionally, or alternatively, UE 120 may include means for receiving a message that includes an instruction to perform intra-cell handover and an instruction to change from an E-UTRA PDCP to an NR PDCP for a radio bearer; means for triggering a key reset procedure comprising generating one or more security keys based at least in part on the instruction to perform the intra-cell handover and the instruction to change from the E-UTRA PDCP to the NR PDCP for the radio bearer; means for communicating using the one or more security keys after the intra-cell handover is performed; and/or the like. In some aspects, such means may include one or more components of UE 120 described in connection with FIG. 2.

In some aspects, base station 110 may include means for transmitting a message that indicates a change from an E-UTRA PDCP to an NR PDCP, wherein the message includes an instruction to perform an intra-cell handover; means for generating one or more security keys based at least in part on transmitting the message that includes the instruction to perform the intra-cell handover; means for communicating using the one or more security keys after the intra-cell handover is performed; and/or the like. Additionally, or alternatively, base station 110 may include means for transmitting a message that indicates a change from an E-UTRA PDCP to an NR PDCP; means for determining a first sequence number that was used prior to transmitting the message; means for determining a second sequence number, to be used after transmitting the message, based at least in part on the first sequence number; means for communicating using the second sequence number; and/or the like. In some aspects, such means may include one or more components of base station 110 described in connection with FIG. 2.

As indicated above, FIG. 2 is provided merely as an example. Other examples may differ from what is described with regard to FIG. 2.

Figure 3:
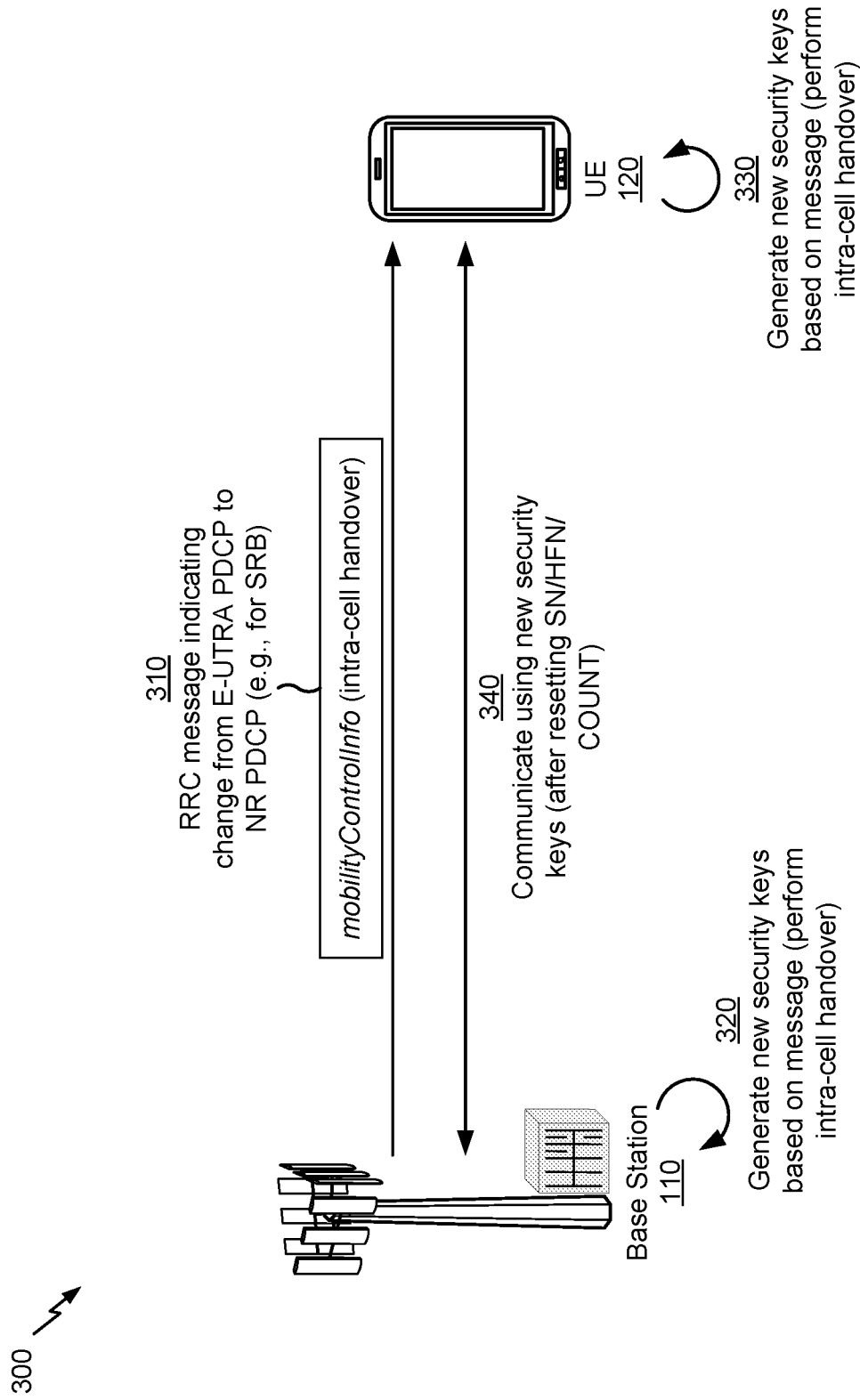
FIGS. 3 and 4 are diagrams illustrating examples of a secure PDCP version change, in accordance with various aspects of the present disclosure.

FIG. 3 is a diagram illustrating an example 300 of a secure PDCP version change, in accordance with various aspects of the present disclosure.

As shown in FIG. 3, a base station 110 and a UE 120 may communicate with one another. For example, the base station 110 and the UE 120 may communicate using PDCP. The PDCP layer may be located above the radio link control (RLC) layer in the radio protocol stack, and may be located below the Internet Protocol (IP) layer in the user plane and below the radio resource control (RRC) layer in the control plane. The PDCP layer may be used for header compression of packets received from an upper layer (e.g., IP, RRC, and/or the like).

Additionally, or alternatively, the PDCP layer may be used to provide secure communications, such as by providing integrity protection and/or ciphering functions. To provide time-varying characteristics for added security, the PDCP layer may add a PDCP sequence number to a packet, such as a PDCP packet data unit (PDU) and/or the like. A PDCP sequence number is attached to each PDCP PDU, and is incremented for successive PDCP PDUs. The PDCP sequence number may be used as an input to generate different security outputs for each PDCP PDU. For example, the PDCP sequence number and a hyperframe number in the PDCP PDU may form a counter value (e.g., referred to as COUNT in the 3GPP specification), which may be used as input, in combination with a radio bearer identifier and a security key, to generate different security outputs.

To improve security by preventing a malicious user from obtaining multiple samples with the same security inputs (e.g., the counter value, the radio bearer identifier, and the security key), the base station 110 may instruct the UE 120 to perform an intra-cell handover when the counter value wraps around (e.g., to zero or another value previously used in a communication between the base station 110 and the UE 120). As part of the intra-cell handover procedure (e.g., an RRC connection release and RRC reconnection to the same cell), the base station 110 and the UE 120 may generate new security keys. Thus, the next PDCP PDU communicated between the base station 110 and the UE 120 may use a same counter value that was previously used for a PDCP PDU, but may use a different security key, thereby preventing multiple PDCP PDUs that use the same security inputs from being transmitted.

In 5G/NR, the NR PDCP layer may support one or more functions that are not supported by an E-UTRA PDCP layer (e.g., a 4G/LTE PDCP layer), such as dual connectivity or split bearer operations for aggregation or separation of packets for multiple radio access technologies (RATs), such as an NR RAT (e.g., a 5G RAT) and an LTE RAT (e.g., a 4G RAT, an E-UTRA RAT, and/or the like). When such additional functionality is necessary, the base station 110 may trigger a PDCP version change from E-UTRA PDCP to NR PDCP. When this change is triggered, the base station 110 and/or the UE 120 may reset a sequence number for the next PDCP PDU communicated between the base station 110 and the UE 120. This may result in the same security inputs being used for multiple communications between the base station 110 and the UE 120, which may reduce security and allow a malicious user to determine the security key used for such communications. Some techniques and apparatuses described herein prevent the same security inputs from being used for multiple communications upon a PDCP version change from E-UTRA PDCP to NR PDCP, thereby increasing security.

As shown by reference number 310, the base station 110 may transmit, and the UE 120 may receive, a message that indicates a change from an E-UTRA PDCP to an NR PDCP. In some aspects, the message indicates the change from the E-UTRA PDCP to the NR PDCP for a signaling radio bearer (SRB). The signaling radio bearer may be a radio bearer that carries control information (e.g., control plane traffic), as opposed to a data radio bearer that carries data (e.g., user data, user plan traffic, and/or the like). In some aspects, the indication to change from the E-UTRA PDCP to the NR PDCP may be signaled in one or more fields of the message (e.g., a particular combination of multiple fields).

As shown, the message may include an instruction to perform an intra-cell handover. For example, the instruction to perform the intra-cell handover may be indicated by a mobility control information (e.g., shown as mobilityControlInfo) information element included in the message. In some aspects, the message is a radio resource control (RRC) message, such as an RRC connection reconfiguration message.

As shown by reference number 320, the base station 110 may generate one or more security keys based at least in part on transmitting the message that includes the instruction to perform the intra-cell handover. For example, the base station 110 may generate one or more new security keys that are different from one or more previous security keys used by the base station 110 before transmitting the message that includes the instruction to perform the intra-cell handover. For example, the base station 110 may use a first set of (e.g., one or more) security keys for a first communication that uses the E-UTRA PDCP. Upon transmitting the message indicating the change from the E-UTRA PDCP to the NR PDCP, the base station 110 may generate a second set of security keys that is different from the first set of security keys. The base station 110 may use the second set of security keys for a second communication that uses the NR PDCP. In this way, the base station 110 may avoid transmitting multiple communications that use the same set of security inputs (e.g., counter value, radio bearer identifier, and set of security keys), thereby increasing security.

In some aspects, the one or more security keys may include one or more access stratum (AS) security keys. Additionally, or alternatively, the one or more security keys may include at least one of: a first security key for integrity protection of RRC signaling (e.g., $K_{RRCint}$); a second security key for ciphering of RRC signaling (e.g., $K_{RRCenc}$); a third security key for ciphering of user data (e.g., $K_{UPenc}$) a base station security key (e.g., $K_{eNB}$) used to derive the first security key, the second security key, and the third security key; and/or the like. In some aspects the base station 110 may generate (or regenerate) all of the security keys described above (e.g., the first, second, third, and base station security keys).

In some aspects, the base station 110 may reset a sequence number and/or a hyperframe number based at least in part on performance of the intra-cell handover (e.g., after transmitting the message to change from the E-UTRA PDCP to the NR PDCP, which includes the instruction to perform the intra-cell handover). Thus, the base station 110 may reset a counter value (e.g., COUNT) used as a security input for ciphering, since the counter value is formed from the combination of the PDCP sequence number and the hyperframe number. In this way, even if multiple communications are generated using the same counter value as a security input, the security key(s) used as security input have changed as described above, thereby increasing security by preventing multiple communications from being generated using the same set of security inputs.

As shown by reference number 330, the UE 120 may generate one or more security keys based at least in part on receiving the message that includes the instruction to perform the intra-cell handover, in a similar manner as described above in connection with the base station 110. For example, the UE 120 may generate one or more new security keys that are different from one or more previous security keys used by the UE 120 before receiving the message that includes the instruction to perform the intra-cell handover. For example, the UE 120 may use a first set of (e.g., one or more) security keys for a first communication that uses the E-UTRA PDCP. Upon receiving the message indicating the change from the E-UTRA PDCP to the NR PDCP, the UE 120 may generate a second set of security keys that is different from the first set of security keys. The UE 120 may use the second set of security keys for a second communication that uses the NR PDCP. In this way, the UE 120 may avoid transmitting multiple communications that use the same set of security inputs (e.g., counter value, radio bearer identifier, and set of security keys), thereby increasing security.

As described above, the one or more security keys may include one or more access stratum (AS) security keys. For example, the one or more security keys may include at least one of: a first security key for integrity protection of RRC signaling (e.g., $K_{RRCint}$); a second security key for ciphering of RRC signaling (e.g., $K_{RRCenc}$); a third security key for ciphering of user data (e.g., $K_{UPenc}$); a base station security key (e.g., $K_{eNB}$) used to derive the first security key, the second security key, and the third security key; and/or the like. In some aspects the UE 120 may generate (or regenerate) all of the security keys described above (e.g., the first, second, third, and base station security keys).

In some aspects, the UE 120 may reset a sequence number and/or a hyperframe number based at least in part on performance of the intra-cell handover (e.g., after receiving the message to change from the E-UTRA PDCP to the NR PDCP, which includes the instruction to perform the intra-cell handover). Thus, the UE 120 may reset a counter value (e.g., COUNT) used as a security input for ciphering, since the counter value is formed from the combination of the PDCP sequence number and the hyperframe number. In this way, even if multiple communications are generated using the same counter value as a security input, the security key(s) used as security input have changed as described above, thereby increasing security by preventing multiple communications from being generated using the same set of security inputs.

As shown by reference number 340, the base station 110 and the UE 120 may communicate using the one or more security keys (e.g., the generated security keys) after the intra-cell handover is performed. For example, the base station 110 may generate a communication using the newly generated set of security keys (e.g., generated by the base station 110) as security input to encrypt or cipher the communication, and may transmit the communication to the UE 120. The UE 120 may receive the communication, may use the newly generated set of security keys (e.g., generated by the UE 120) as security input to decrypt or decipher the communication, and may obtain the resulting contents of the communication. The security keys generated by the base station 110 and the UE 120 may be generated from a common algorithm (e.g., known to both the base station 110 and the UE 120), so that the security keys match and can be used to encrypt and decrypt communications.

Similarly, the UE 120 may generate a communication using the newly generated set of security keys (e.g., generated by the UE 120) as security input to encrypt or cipher the communication, and may transmit the communication to the base station 110. The base station 110 may receive the communication, may use the newly generated set of security keys (e.g., generated by the base station 110) as security input to decrypt or decipher the communication, and may obtain the resulting contents of the communication.

By triggering an intra-cell handover and a corresponding regeneration of security keys used to generate communications after a switch from E-UTRA PDCP to NR PDCP, the base station 110 and the UE 120 may increase security of such communications by ensuring that multiple communications, generated using the same security inputs, are not transmitted over the air interface.

As indicated above, FIG. 3 is provided as an example. Other examples may differ from what is described with respect to FIG. 3.

Figure 4:
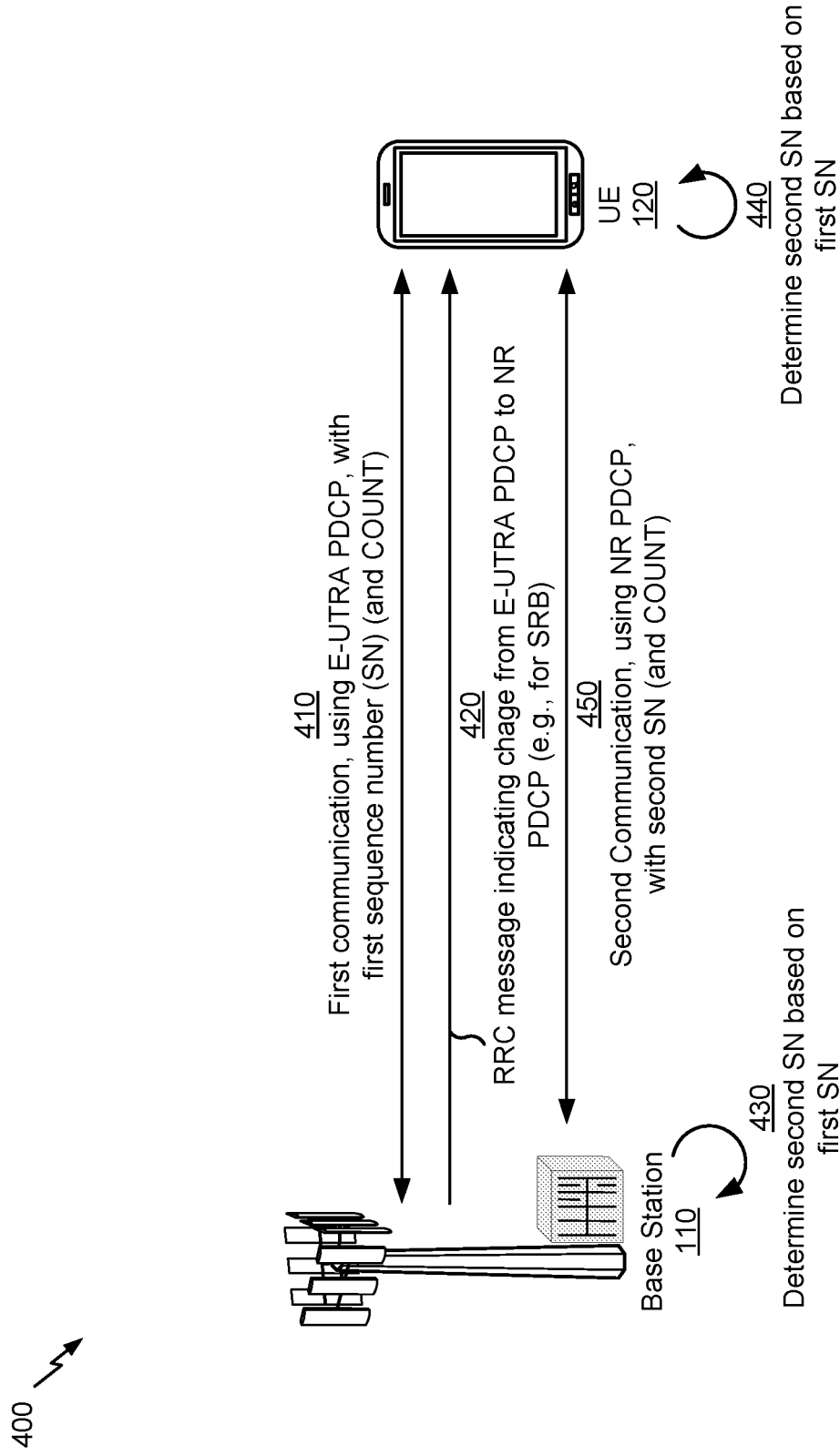

FIG. 4 is a diagram illustrating another example 400 of a secure PDCP version change, in accordance with various aspects of the present disclosure.

As shown in FIG. 4, a base station 110 and a UE 120 may communicate with one another. For example, the base station 110 and the UE 120 may communicate using PDCP, as described above in connection with FIG. 3.

As shown by reference number 410, the base station 110 and the UE 120 may communicate (e.g., transmit and/or receive) a first communication, using E-UTRA PDCP, that includes a first sequence number. The first sequence number, together with a hyperframe number included in the first communication, may form a first counter value (e.g., COUNT). The first communication may be communicated before communication of a message that indicates a change from the E-UTRA PDCP to an NR PDCP, as described below.

As shown by reference number 420, the base station 110 may transmit, and the UE 120 may receive, a message that indicates a change from E-UTRA PDCP to NR PDCP. In some aspects, the message does not include an instruction to perform an intra-cell handover. For example, the message may not include a mobility control information (mobilityControlInfo) information element that includes the instruction to perform the intra-cell handover. In some aspects, the message indicates the change from the E-UTRA PDCP to the NR PDCP for a signaling radio bearer (SRB). In some aspects, the message is an RRC message, such as an RRC connection reconfiguration message.

As shown by reference number 430, the base station 110 may determine a first sequence number that was used prior to transmitting the message (e.g., the first sequence number that was included in the first communication), and may determine a second sequence number, to be used after transmitting the message, based at least in part on the first sequence number. For example, the base station 110 may determine the second sequence number by incrementing the first sequence number.

As shown by reference number 440, the UE 120 may determine a first sequence number that was used prior to receiving the message (e.g., the first sequence number that was included in the first communication), and may determine a second sequence number, to be used after receiving the message, based at least in part on the first sequence number. For example, the UE 120 may determine the second sequence number by incrementing the first sequence number.

As shown by reference number 450, the base station 110 and the UE 120 may communicate using the second sequence number. For example, the base station 110 and the UE 120 may communicate (e.g., transmit and/or receive) a second communication, using NR PDCP, that includes the second sequence number (e.g., determined as described above). The second sequence number, together with a hyperframe number included in the second communication, may form a second counter value (e.g., COUNT). The second communication may be communicated after communication of the message that indicates the change from the E-UTRA PDCP to the NR PDCP.

In some aspects, the base station 110 and the UE 120 may use the same set of security keys before and after communication of the message that indicates the change from the E-UTRA PDCP to the NR PDCP. For example, the first communication may be encrypted and/or decrypted using the same set of security keys as the second communication. The set of security keys that may be used for these communications are described in more detail above in connection with FIG. 3. Although the communications before and after the PDCP version change may be generated using the same set of security keys used as security input, the counter value (e.g., formed from the PDCP sequence number) used as security input may change across these communications (e.g., may be incremented without being reset). Thus, the base station 110 and the UE 120 may increase security of such communications by ensuring that multiple communications, generated using the same security inputs, are not transmitted over the air interface.

As indicated above, FIG. 4 is provided as an example. Other examples may differ from what is described with respect to FIG. 4.

Figure 5:
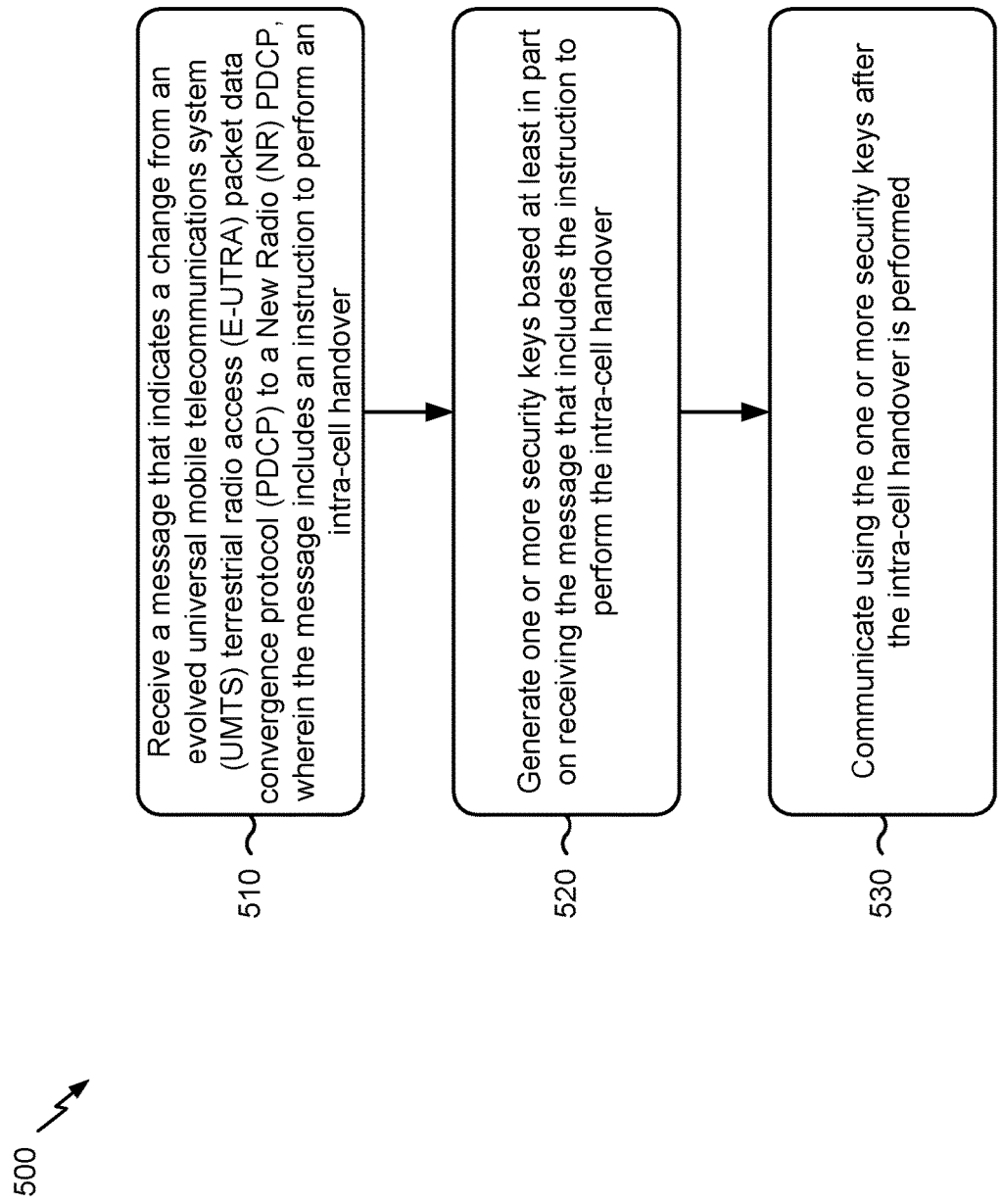
FIGS. 5-9 are diagrams illustrating example processes relating to a secure PDCP version change, in accordance with various aspects of the present disclosure.

FIG. 5 is a diagram illustrating an example process 500 performed, for example, by a UE, in accordance with various aspects of the present disclosure. Example process 500 is an example where a UE (e.g., UE 120 and/or the like) performs operations associated with a secure PDCP version change.

As shown in FIG. 5, in some aspects, process 500 may include receiving a message that indicates a change from an E-UTRA PDCP to an NR PDCP, wherein the message includes an instruction to perform an intra-cell handover (block 510). For example, the UE (e.g., using antenna 252, DEMOD 254, MIMO detector 256, receive processor 258, controller/processor 280, and/or the like) may receive a message that indicates a change from an E-UTRA PDCP to an NR PDCP, as described above in connection with FIG. 3. In some aspects, the message includes an instruction to perform an intra-cell handover.

As further shown in FIG. 5, in some aspects, process 500 may include generating one or more security keys based at least in part on receiving the message that includes the instruction to perform the intra-cell handover (block 520). For example, the UE (e.g., using controller/processor 280 and/or the like) may generate one or more security keys based at least in part on receiving the message that includes the instruction to perform the intra-cell handover, as described above in connection with FIG. 3.

As further shown in FIG. 5, in some aspects, process 500 may include communicating using the one or more security keys after the intra-cell handover is performed (block 530). For example, the UE (e.g., using antenna 252, DEMOD 254, MOD 254, MIMO detector 256, receive processor 258, transmit processor 264, TX MIMO processor 266, controller/processor 280, and/or the like) may communicate (e.g., transmit and/or receive) using the one or more security keys after the intra-cell handover is performed, as described above in connection with FIG. 3.

Process 500 may include additional aspects, such as any single aspect or any combination of aspects described below and/or in connection with one or more other processes described elsewhere herein.

In a first aspect, the message indicates the change from the E-UTRA PDCP to the NR PDCP for a signaling radio bearer. In a second aspect, alone or in combination with the first aspect, the message is a radio resource control (RRC) connection reconfiguration message. In a third aspect, alone or in combination with one or more of the first and second aspects, the instruction to perform the intra-cell handover is indicated by a mobility control information (mobilityControlInfo) information element included in the message. In a fourth aspect, alone or in combination with one or more of the first through third aspects, a sequence number and a hyperframe number are reset based at least in part on performance of the intra-cell handover.

In a fifth aspect, alone or in combination with one or more of the first through fourth aspects, the one or more security keys are different from one or more previous security keys used by the UE before receiving the message that includes the instruction to perform the intra-cell handover. In a sixth aspect, alone or in combination with one or more of the first through fifth aspects, the one or more security keys are access stratum (AS) security keys. In a seventh aspect, alone or in combination with one or more of the first through sixth aspects, the one or more security keys include at least one of: a first security key for integrity protection of RRC signaling ($K_{RRCint}$), a second security key for ciphering of RRC signaling ($K_{RRCenc}$), a third security key for ciphering of user data ($K_{UPenc}$), a base station security key ($K_{eNB}$) used to derive the first security key, the second security key, and the third security key, or some combination thereof. In an eighth aspect, alone or in combination with one or more of the first through seventh aspects, the change from the E-UTRA PDCP to the NR PDCP is signaled using a particular combination of fields in the message.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
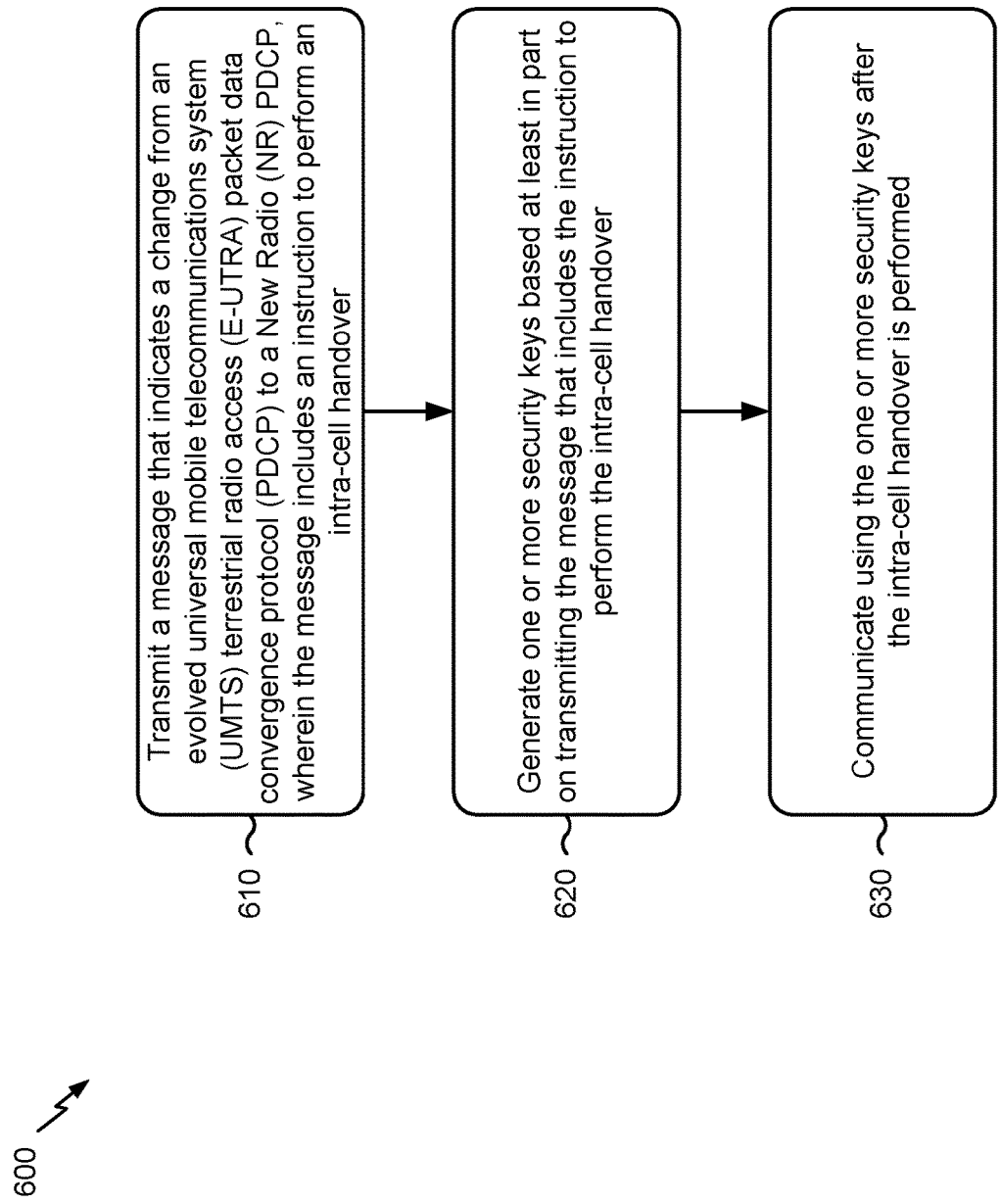

FIG. 6 is a diagram illustrating an example process 600 performed, for example, by a base station, in accordance with various aspects of the present disclosure. Example process 600 is an example where a base station (e.g., base station 110 and/or the like) performs operations associated with a secure PDCP version change.

As shown in FIG. 6, in some aspects, process 600 may include transmitting a message that indicates a change from an E-UTRA PDCP to an NR PDCP, wherein the message includes an instruction to perform an intra-cell handover (block 610). For example, the base station (e.g., using controller/processor 240, transmit processor 220, TX MIMO processor 230, MOD 232, antenna 234, and/or the like) may transmit a message that indicates a change from an E-UTRA PDCP to an NR PDCP, as described above in connection with FIG. 3. In some aspects, the message includes an instruction to perform an intra-cell handover.

As further shown in FIG. 6, in some aspects, process 600 may include generating one or more security keys based at least in part on transmitting the message that includes the instruction to perform the intra-cell handover (block 620). For example, the base station (e.g., using controller/processor 240 and/or the like) may generate one or more security keys based at least in part on transmitting the message that includes the instruction to perform the intra-cell handover, as described above in connection with FIG. 3.

As further shown in FIG. 6, in some aspects, process 600 may include communicating using the one or more security keys after the intra-cell handover is performed (block 630). For example, the base station (e.g., using transmit processor 220, TX MIMO processor 230, MOD 232, antenna 234, DEMOD 232, MIMO detector 236, receive processor 238, controller/processor 240, and/or the like) may communicate (e.g., transmit and/or receive) using the one or more security keys after the intra-cell handover is performed, as described above in connection with FIG. 3.

Process 600 may include additional aspects, such as any single aspect or any combination of aspects described below and/or in connection with one or more other processes described elsewhere herein.

In a first aspect, the message indicates the change from the E-UTRA PDCP to the NR PDCP for a signaling radio bearer. In a second aspect, alone or in combination with the first aspect, the message is an RRC connection reconfiguration message. In a third aspect, alone or in combination with one or more of the first and second aspects, the instruction to perform the intra-cell handover is indicated by a mobility control information (mobilityControlInfo) information element included in the message. In a fourth aspect, alone or in combination with one or more of the first through third aspects, a sequence number and a hyperframe number are reset based at least in part on performance of the intra-cell handover.

In a fifth aspect, alone or in combination with one or more of the first through fourth aspects, the one or more security keys are different from one or more previous security keys used by the base station before transmitting the message that includes the instruction to perform the intra-cell handover. In a sixth aspect, alone or in combination with one or more of the first through fifth aspects, the one or more security keys are access stratum (AS) security keys. In a seventh aspect, alone or in combination with one or more of the first through sixth aspects, the one or more security keys include at least one of: a first security key for integrity protection of RRC signaling ($K_{RRCint}$), a second security key for ciphering of RRC signaling ($K_{RRCenc}$), a third security key for ciphering of user data ($K_{UPenc}$), a base station security key ($K_{eNB}$) used to derive the first security key, the second security key, and the third security key, or some combination thereof. In an eighth aspect, alone or in combination with one or more of the first through seventh aspects, the change from the E-UTRA PDCP to the NR PDCP is signaled using a particular combination of fields in the message.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
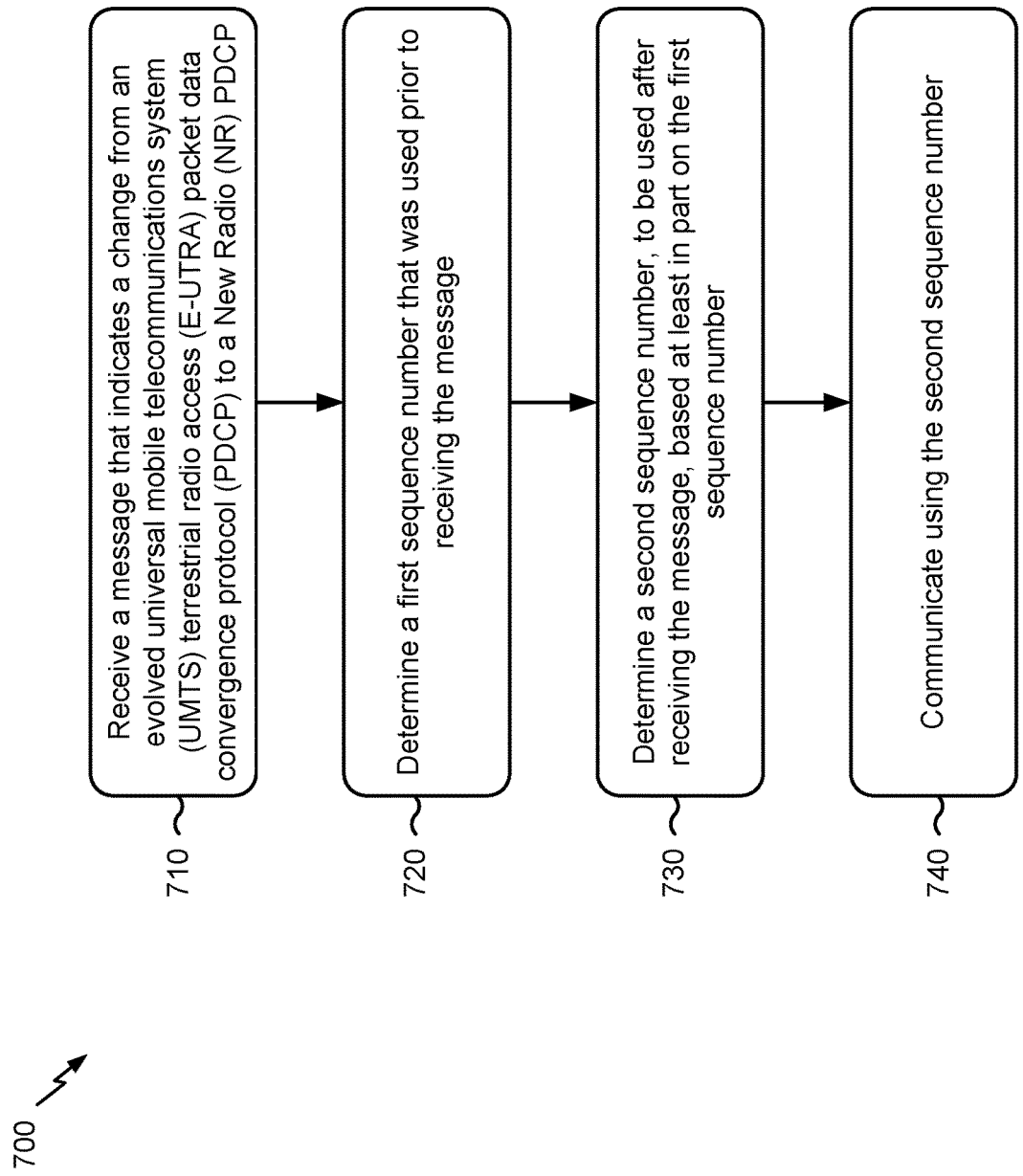

FIG. 7 is a diagram illustrating an example process 700 performed, for example, by a UE, in accordance with various aspects of the present disclosure. Example process 700 is an example where a UE (e.g., UE 120 and/or the like) performs operations associated with a secure PDCP version change.

As shown in FIG. 7, in some aspects, process 700 may include receiving a message that indicates a change from an E-UTRA PDCP to an NR PDCP (block 710). For example, the UE (e.g., using antenna 252, DEMOD 254, MIMO detector 256, receive processor 258, controller/processor 280, and/or the like) may receive a message that indicates a change from an E-UTRA PDCP to an NR PDCP, as described above in connection with FIG. 4.

As further shown in FIG. 7, in some aspects, process 700 may include determining a first sequence number that was used prior to receiving the message (block 720). For example, the UE (e.g., using controller/processor 280 and/or the like) may determine a first sequence number that was used prior to receiving the message, as described above in connection with FIG. 4.

As further shown in FIG. 7, in some aspects, process 700 may include determining a second sequence number, to be used after receiving the message, based at least in part on the first sequence number (block 730). For example, the UE (e.g., using controller/processor 280 and/or the like) may determine a second sequence number, to be used after receiving the message, based at least in part on the first sequence number, as described above in connection with FIG. 4.

As further shown in FIG. 7, in some aspects, process 700 may include communicating using the second sequence number (block 740). For example, the UE (e.g., using antenna 252, DEMOD 254, MOD 254, MIMO detector 256, receive processor 258, transmit processor 264, TX MIMO processor 266, controller/processor 280, and/or the like) may communicate (e.g., transmit and/or receive) using the second sequence number, as described above in connection with FIG. 4.

Process 700 may include additional aspects, such as any single aspect or any combination of aspects described below and/or in connection with one or more other processes described elsewhere herein.

In a first aspect, the message does not include an instruction to perform an intra-cell handover. In a second aspect, alone or in combination with the first aspect, the second sequence number is determined by incrementing the first sequence number. In a third aspect, alone or in combination with one or more of the first and second aspects, the first sequence number is used for a first communication that uses the E-UTRA PDCP, and the second sequence number is used for a second communication that uses the NR PDCP. In a fourth aspect, alone or in combination with one or more of the first through third aspects, the first communication and the second communication use a same set of access stratum security keys. In a fifth aspect, alone or in combination with one or more of the first through fourth aspects, the message indicates the change from the E-UTRA PDCP to the NR PDCP for a signaling radio bearer. In a sixth aspect, alone or in combination with one or more of the first through fifth aspects, the message is a radio resource control (RRC) connection reconfiguration message. In a seventh aspect, alone or in combination with one or more of the first through sixth aspects, the change from the E-UTRA PDCP to the NR PDCP is signaled using a particular combination of fields in the message.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
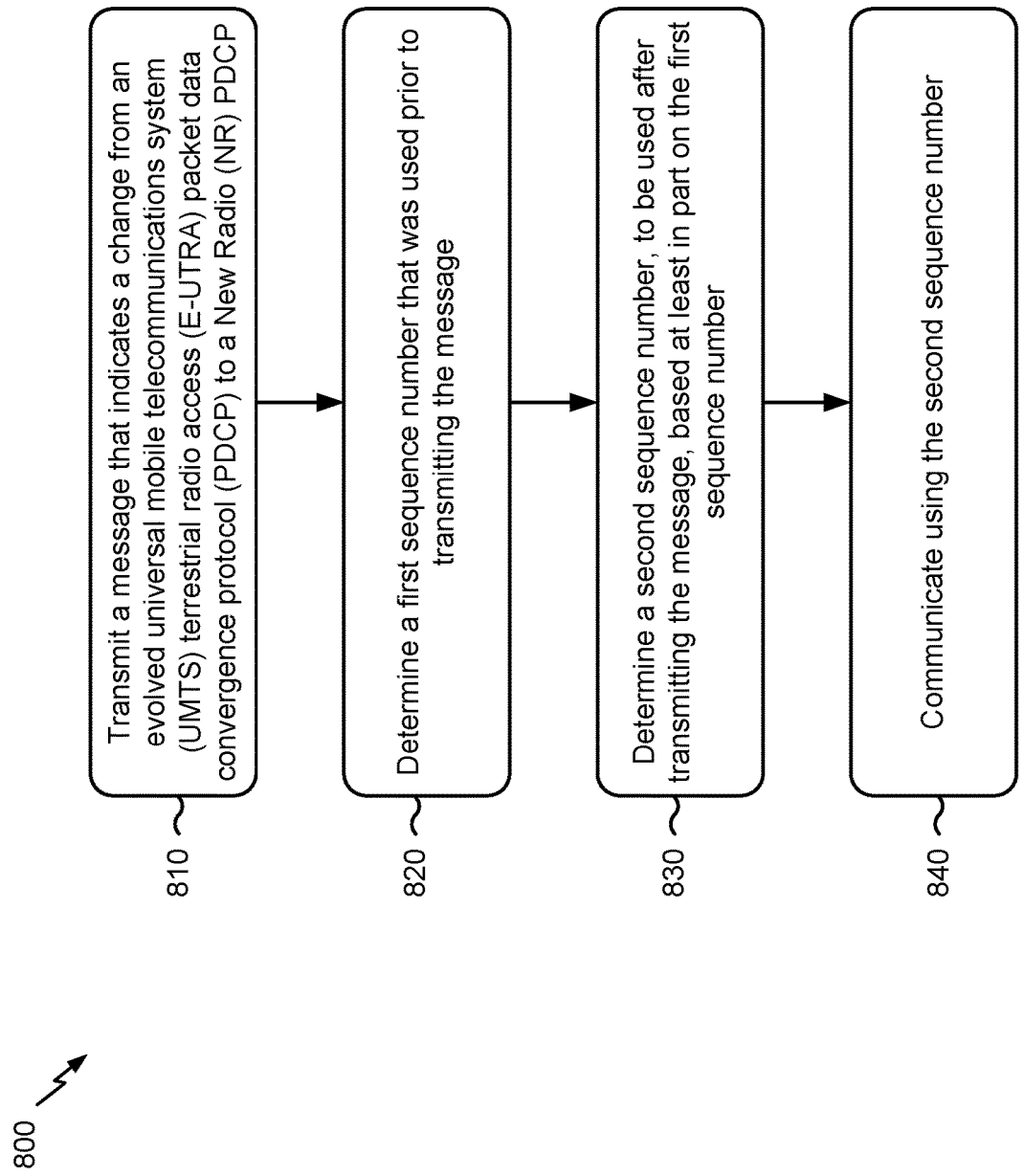

FIG. 8 is a diagram illustrating an example process 800 performed, for example, by a base station, in accordance with various aspects of the present disclosure. Example process 800 is an example where a base station (e.g., base station 110 and/or the like) performs operations associated with a secure PDCP version change.

As shown in FIG. 8, in some aspects, process 800 may include transmitting a message that indicates a change from an E-UTRA PDCP to an NR PDCP (block 810). For example, the base station (e.g., using controller/processor 240, transmit processor 220, TX MIMO processor 230, MOD 232, antenna 234, and/or the like) may transmit a message that indicates a change from an E-UTRA PDCP to an NR PDCP, as described above in connection with FIG. 4.

As further shown in FIG. 8, in some aspects, process 800 may include determining a first sequence number that was used prior to transmitting the message (block 820). For example, the base station (e.g., using controller/processor 240 and/or the like) may determine a first sequence number that was used prior to transmitting the message, as described above in connection with FIG. 4.

As further shown in FIG. 8, in some aspects, process 800 may include determining a second sequence number, to be used after transmitting the message, based at least in part on the first sequence number (block 830). For example, the base station (e.g., using controller/processor 240 and/or the like) may determine a second sequence number, to be used after transmitting the message, based at least in part on the first sequence number, as described above in connection with FIG. 4.

As further shown in FIG. 8, in some aspects, process 800 may include communicating using the second sequence number (block 840). For example, the base station (e.g., using transmit processor 220, TX MIMO processor 230, MOD 232, antenna 234, DEMOD 232, MIMO detector 236, receive processor 238, controller/processor 240, and/or the like) may communicate (e.g., transmit and/or receive) using the second sequence number, as described above in connection with FIG. 4.

Process 800 may include additional aspects, such as any single aspect or any combination of aspects described below and/or in connection with one or more other processes described elsewhere herein.

In a first aspect, the message does not include an instruction to perform an intra-cell handover. In a second aspect, alone or in combination with the first aspect, the second sequence number is determined by incrementing the first sequence number. In a third aspect, alone or in combination with one or more of the first and second aspects, the first sequence number is used for a first communication that uses the E-UTRA PDCP, and the second sequence number is used for a second communication that uses the NR PDCP. In a fourth aspect, alone or in combination with one or more of the first through third aspects, the first communication and the second communication use a same set of access stratum security keys. In a fifth aspect, alone or in combination with one or more of the first through fourth aspects, the message indicates the change from the E-UTRA PDCP to the NR PDCP for a signaling radio bearer. In a sixth aspect, alone or in combination with one or more of the first through fifth aspects, the message is an RRC connection reconfiguration message. In a seventh aspect, alone or in combination with one or more of the first through sixth aspects, the change from the E-UTRA PDCP to the NR PDCP is signaled using a particular combination of fields in the message.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
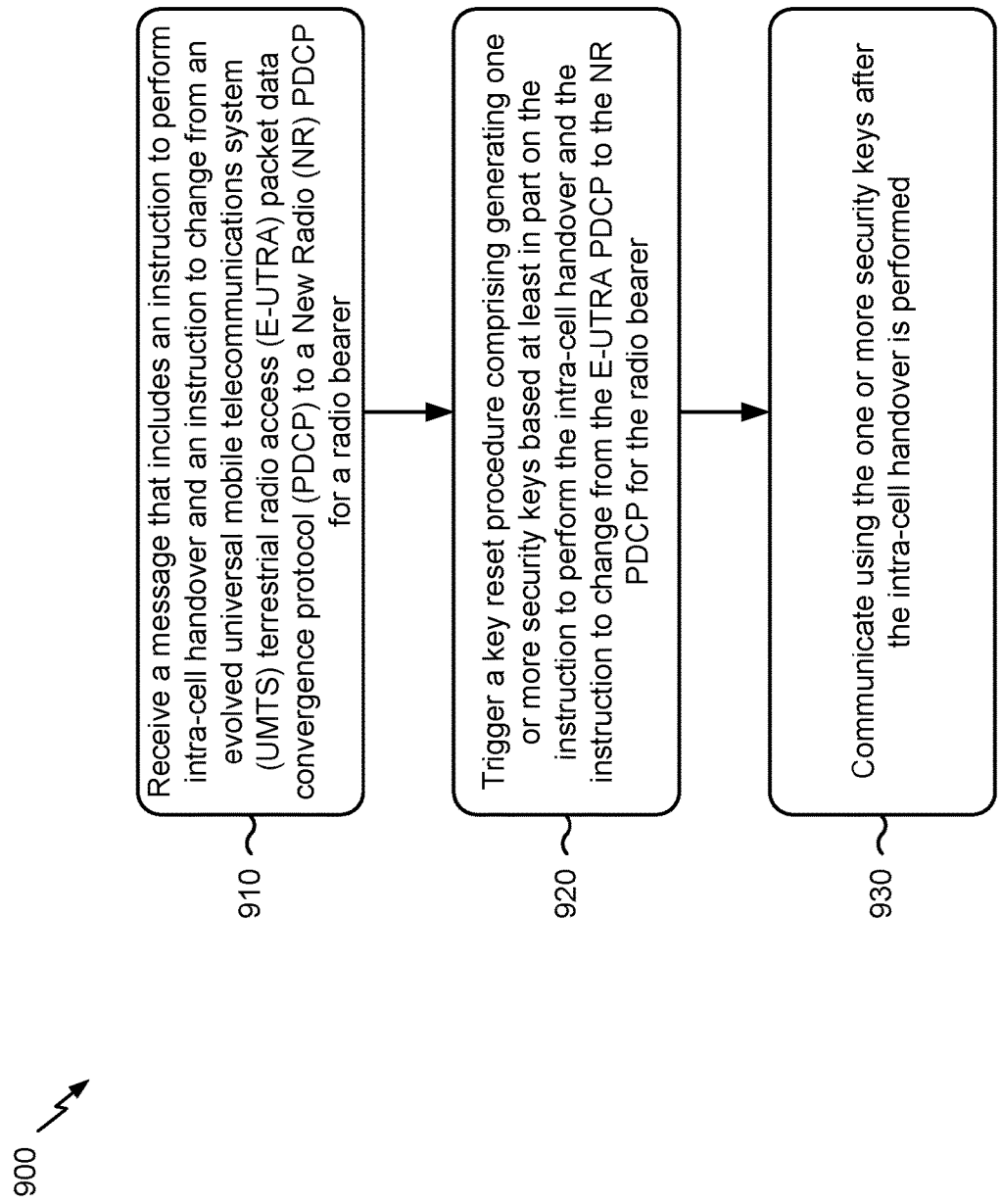

FIG. 9 is a diagram illustrating an example process 900 performed, for example, by a UE, in accordance with various aspects of the present disclosure. Example process 900 is an example where a UE (e.g., UE 120 and/or the like) performs operations associated with a secure PDCP version change.

As shown in FIG. 9, in some aspects, process 900 may include receiving a message that includes an instruction to perform intra-cell handover and an instruction to change from an E-UTRA PDCP to an NR PDCP for a radio bearer (block 910). For example, the UE (e.g., using antenna 252, DEMOD 254, MIMO detector 256, receive processor 258, controller/processor 280, and/or the like) may receive a message that includes an instruction to perform intra-cell handover and an instruction to change from an E-UTRA PDCP to an NR PDCP for a radio bearer, as described above in connection with FIG. 3.

As further shown in FIG. 9, in some aspects, process 900 may include triggering a key reset procedure comprising generating one or more security keys based at least in part on the instruction to perform the intra-cell handover and the instruction to change from the E-UTRA PDCP to the NR PDCP for the radio bearer (block 920). For example, the UE (e.g., using controller/processor 280 and/or the like) may trigger a key reset procedure comprising generating one or more security keys based at least in part on the instruction to perform the intra-cell handover and the instruction to change from the E-UTRA PDCP to the NR PDCP for the radio bearer, as described above in connection with FIG. 3.

As further shown in FIG. 9, in some aspects, process 900 may include communicating using the one or more security keys after the intra-cell handover is performed (block 930). For example, the UE (e.g., using antenna 252, DEMOD 254, MIMO detector 256, receive processor 258, controller/processor 280, transmit processor 264, TX MIMO processor 266, MOD 254, and/or the like) may communicate (e.g., transmit and/or receive) using the one or more security keys after the intra-cell handover is performed, as described above in connection with FIG. 3.

Process 900 may include additional aspects, such as any single aspect or any combination of aspects described below and/or in connection with one or more other processes described elsewhere herein.

In a first aspect, the radio bearer is a signaling radio bearer. In a second aspect, alone or in combination with the first aspect, the message is a radio resource control (RRC) connection reconfiguration message. In a third aspect, alone or in combination with one or more of the first and second aspects, the instruction to perform the intra-cell handover is indicated by a mobility control information (mobilityControlInfo) information element included in the message. In a fourth aspect, alone or in combination with one or more of the first through third aspects, the instruction to change the E-UTRA PDCP to the NR PDCP is indicated in one or more fields of the message. In a fifth aspect, alone or in combination with one or more of the first through fourth aspects, the instruction to change the E-UTRA PDCP to the NR PDCP is indicated in multiple fields of the message. In a sixth aspect, alone or in combination with one or more of the first through fifth aspects, a sequence number and a hyperframe number are reset based at least in part on performance of the intra-cell handover.

In a seventh aspect, alone or in combination with one or more of the first through sixth aspects, the one or more security keys are different from one or more previous security keys used by the UE before receiving the message. In an eighth aspect, alone or in combination with one or more of the first through seventh aspects, the one or more security keys are AS security keys. In a ninth aspect, alone or in combination with one or more of the first through eighth aspects, the one or more security keys include at least one of: a first security key for integrity protection of RRC signaling ($K_{RRCint}$), a second security key for ciphering of RRC signaling ($K_{RRCenc}$), a third security key for ciphering of user data ($K_{UPenc}$), a base station security key ($K_{eNB}$) used to derive the first security key, the second security key, and the third security key, or some combination thereof.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, and/or a combination of hardware and software.

As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
- receiving a message that indicates a change from an evolved universal mobile telecommunications system (UMTS) terrestrial radio access (E-UTRA) packet data convergence protocol (PDCP) to a New Radio (NR) PDCP,
  - wherein the message includes an instruction to perform an intra-cell handover;
- generating one or more security keys based at least in part on receiving the message that includes the instruction to perform the intra-cell handover,
  - wherein a sequence number and a hyperframe number are reset based at least in part on performance of the intra-cell handover; and
- communicating using the one or more security keys after the intra-cell handover is performed.

2. The method of claim 1, wherein the message indicates the change from the E-UTRA PDCP to the NR PDCP for a signaling radio bearer.

3. The method of claim 1, wherein the message is a radio resource control (RRC) connection reconfiguration message.

4. The method of claim 1, wherein the instruction to perform the intra-cell handover is indicated by a mobility control information (mobilityControlInfo) information element included in the message.

5. The method of claim 1, wherein the one or more security keys are different from one or more previous security keys used by the UE before receiving the message that includes the instruction to perform the intra-cell handover.

6. The method of claim 1, wherein the one or more security keys include at least one of:
- one or more access stratum (AS) security keys,
- a first security key for integrity protection of radio resource control (RRC) signaling ($K_{RRCint}$),
- a second security key for ciphering of RRC signaling ($K_{RRCenc}$),
- a third security key for ciphering of user data ($K_{UPenc}$), or
- a base station security key ($K_{eNB}$) used to derive the first security key, the second security key, and the third security key.

7. The method of claim 1, wherein the change from the E-UTRA PDCP to the NR PDCP is signaled using a particular combination of fields in the message.

8. The method of claim 1, wherein the sequence number and the hyperframe number form a counter value.

9. A method of wireless communication performed by a base station, comprising:
- transmitting a message that indicates a change from an evolved universal mobile telecommunications system (UMTS) terrestrial radio access (E-UTRA) packet data convergence protocol (PDCP) to a New Radio (NR) PDCP,
  - wherein the message includes an instruction to perform an intra-cell handover;
- generating one or more security keys based at least in part on transmitting the message that includes the instruction to perform the intra-cell handover,
  - wherein a sequence number and a hyperframe number are reset based at least in part on performance of the intra-cell handover; and
- communicating using the one or more security keys after the intra-cell handover is performed.

10. The method of claim 9, wherein the message indicates the change from the E-UTRA PDCP to the NR PDCP for a signaling radio bearer.

11. The method of claim 9, wherein the message is a radio resource control (RRC) connection reconfiguration message.

12. The method of claim 9, wherein the instruction to perform the intra-cell handover is indicated by a mobility control information (mobilityControlInfo) information element included in the message.

13. The method of claim 9, wherein the one or more security keys are different from one or more previous security keys used by the base station before transmitting the message that includes the instruction to perform the intra-cell handover.

14. The method of claim 9, wherein the one or more security keys include at least one of:
one or more access stratum (AS) security keys,
a first security key for integrity protection of radio resource control (RRC) signaling ($K_{RRCint}$),
a second security key for ciphering of RRC signaling ($K_{RRCenc}$),
a third security key for ciphering of user data ($K_{UPenc}$), or
a base station security key ($K_{eNB}$) used to derive the first security key, the second security key, and the third security key.

15. The method of claim 9, wherein the sequence number and the hyperframe number form a counter value.

16. An apparatus for wireless communication at a user equipment (UE), comprising:
a memory; and
one or more processors coupled to the memory, the memory and the one or more processors configured to:
receive a message that indicates a change from an evolved universal mobile telecommunications system (UMTS) terrestrial radio access (E-UTRA) packet data convergence protocol (PDCP) to a New Radio (NR) PDCP,
wherein the message includes an instruction to perform an intra-cell handover;
generate one or more security keys based at least in part on receiving the message that includes the instruction to perform the intra-cell handover,
wherein a sequence number and a hyperframe number are reset based at least in part on performance of the intra-cell handover; and
communicate using the one or more security keys after the intra-cell handover is performed.

17. The apparatus of claim 16, wherein the message indicates the change from the E-UTRA PDCP to the NR PDCP for a signaling radio bearer.

18. The apparatus of claim 16, wherein the message is a radio resource control (RRC) connection reconfiguration message.

19. The apparatus of claim 16, wherein the instruction to perform the intra-cell handover is indicated by a mobility control information (mobilityControlInfo) information element included in the message.

20. The apparatus of claim 16, wherein the one or more security keys are different from one or more previous security keys used by the UE before receiving the message that includes the instruction to perform the intra-cell handover.

21. The apparatus of claim 16, wherein the one or more security keys include at least one of:
one or more access stratum (AS) security keys,
a first security key for integrity protection of radio resource control (RRC) signaling ($K_{RRCint}$),
a second security key for ciphering of RRC signaling ($K_{RRCenc}$),
a third security key for ciphering of user data ($K_{UPenc}$), or
a base station security key ($K_{eNB}$) used to derive the first security key, the second security key, and the third security key.

22. The apparatus of claim 16, wherein the change from the E-UTRA PDCP to the NR PDCP is signaled using a particular combination of fields in the message.

23. The apparatus of claim 16, wherein the sequence number and the hyperframe number form a counter value.

24. An apparatus for wireless communication at a base station, comprising:
a memory; and
one or more processors coupled to the memory, the memory and the one or more processors configured to:
transmit a message that indicates a change from an evolved universal mobile telecommunications system (UMTS) terrestrial radio access (E-UTRA) packet data convergence protocol (PDCP) to a New Radio (NR) PDCP, wherein the message includes an instruction to perform an intra-cell handover;
generate one or more security keys based at least in part on transmitting the message that includes the instruction to perform the intra-cell handover,
wherein a sequence number and a hyperframe number are reset based at least in part on performance of the intra-cell handover; and
communicate using the one or more security keys after the intra-cell handover is performed.

25. The apparatus of claim 24, wherein the message indicates the change from the E-UTRA PDCP to the NR PDCP for a signaling radio bearer.

26. The apparatus of claim 24, wherein the message is a radio resource control (RRC) connection reconfiguration message.

27. The apparatus of claim 24, wherein the instruction to perform the intra-cell handover is indicated by a mobility control information (mobilityControlInfo) information element included in the message.

28. The apparatus of claim 24, wherein the one or more security keys are different from one or more previous security keys used by the base station before transmitting the message that includes the instruction to perform the intra-cell handover.

29. The apparatus of claim 24, wherein the one or more security keys include at least one of:
one or more access stratum (AS) security keys,
a first security key for integrity protection of radio resource control (RRC) signaling ($K_{RRCint}$),
a second security key for ciphering of RRC signaling ($K_{RRCenc}$),
a third security key for ciphering of user data ($K_{UPenc}$), or
a base station security key ($K_{eNB}$) used to derive the first security key, the second security key, and the third security key.

30. The apparatus of claim 24, wherein the sequence number and the hyperframe number form a counter value.

* * * * *